United States Patent
Vaara

(10) Patent No.: US 6,400,951 B1
(45) Date of Patent: Jun. 4, 2002

(54) HANDOVER AND CALL SETUP IN A MOBILE COMMUNICATION SYSTEM

(75) Inventor: Tomi Vaara, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/387,718

(22) Filed: Aug. 26, 1999

Related U.S. Application Data

(63) Continuation of application No. PCT/FI98/00131, filed on Feb. 13, 1998.

(30) Foreign Application Priority Data

Feb. 28, 1997 (FI) .................................................. 970872

(51) Int. Cl.⁷ ................................................ H04B 1/16
(52) U.S. Cl. ........................ 455/436; 455/437; 455/439; 455/513
(58) Field of Search .................. 455/414, 421, 455/432, 433, 434, 436, 437, 439, 442, 443, 512, 513; 370/331, 330, 329

(56) References Cited

U.S. PATENT DOCUMENTS

| | | | | |
|---|---|---|---|---|
| 5,432,843 A | * | 7/1995 | Bonta ........................... | 379/60 |
| 5,509,051 A | * | 4/1996 | Barnett et al. ................. | 379/59 |
| 5,574,968 A | * | 11/1996 | Olds et al. .................. | 455/12.1 |
| 5,613,205 A | * | 3/1997 | Dufour ....................... | 455/33.2 |
| 5,768,267 A | * | 6/1998 | Raith et al. .................. | 370/329 |
| 5,854,981 A | * | 12/1998 | Wallstedt et al. ............ | 455/439 |
| 5,915,219 A | * | 6/1999 | Poyhonen .................... | 455/435 |
| 5,915,221 A | * | 6/1999 | Sawyer et al. .............. | 455/437 |
| 5,999,816 A | * | 12/1999 | Tiedemann, Jr. et al. ... | 455/437 |
| 6,058,308 A | * | 5/2000 | Kallin et al. ................. | 455/432 |
| 6,081,713 A | * | 6/2000 | Desgagne .................... | 455/436 |
| 6,088,598 A | * | 7/2000 | Marsolais .................... | 455/566 |
| 6,134,443 A | * | 10/2000 | Spann et al. ................. | 455/450 |
| 6,167,274 A | * | 12/2000 | Smith .......................... | 455/456 |
| 6,181,946 B1 | * | 1/2001 | Gettleman et al. .......... | 455/509 |
| 6,192,245 B1 | * | 2/2001 | Jones et al. ................. | 455/437 |
| 6,201,968 B1 | * | 3/2001 | Ostroff et al. .............. | 455/436 |

FOREIGN PATENT DOCUMENTS

| | | |
|---|---|---|
| FI | 970034 | 1/1997 |
| WO | WO 9502309 | 1/1995 |
| WO | WO 9504423 | 2/1995 |
| WO | WO 9636190 | 11/1996 |
| WO | WO 9706648 | 2/1997 |

\* cited by examiner

*Primary Examiner*—William Trost
*Assistant Examiner*—Congvan Tran
(74) *Attorney, Agent, or Firm*—Altera Law Group, LLC

(57) ABSTRACT

An handover method and a call setup method in a mobile communication system. A cell to be assigned to the mobile station (MS) is selected on the basis of the measurement results and the special cell list. The selected cell is set as the target cell of the handover for the mobile station. The traffic channel for the mobile station (MS) is assigned from the base station of the selected cell.

6 Claims, 8 Drawing Sheets

HANDOVER AND CALL SETUP IN A MOBILE COMMUNICATION SYSTEM

This application is a continuation of international application number PCT/FI98/00131, filed Feb. 13, 1998, pending.

FIELD OF THE INVENTION

The invention relates to a handover method and a call setup method in a mobile communication system that consists of base stations and mobile stations, and in which, at least for some of the mobile stations a mobile station-specific special cell list has been created, which contains the identifier for at least one cell that offers special service to the mobile station. The handover method comprises the following steps: setting at least one handover criterion, measuring the quality and signal level of the radio link in the base station and mobile station, measuring the signal level of the neighboring base stations in the mobile station, transmitting the measurement results acquired by the mobile station from the mobile station to the base station as a report message, and performing the handover to the target cell, when the handover criteria are met. The call setup method comprises the following steps: measuring in the mobile station the signal level of the base station of the camping cell and that of the neighboring base stations, establishing the signaling link between the base station and the mobile station, transmitting the measurement results from the mobile station to the base station as a report message, and performing the call setup in the traffic channel assigned to the mobile station.

Additionally, the invention relates to the mobile station and the arrangement for the selection of the base station.

BACKGROUND OF THE INVENTION

In cellular mobile communication networks the mobile station can move freely within the mobile communication network and connect to the best base station signal available at the time. Usually all base stations offer essentially identical services to the mobile stations in the network. However, some base stations can be configured to offer a special service to all mobile stations in the network, for example, a special tariff. The base station transmits information about such special service in its broadcast channel so that the subscribers in this region of the network notice the fact and can make use of this service.

The FI patent application publication #970034 describes offering tailored special services from some mobile communication network cells to individual mobile stations or a group of mobile stations by using subscriber-or subscriber group-specific local service regions. Such special services include, for example, special tariffs and data services. In a method according to the publication, a mobile station-specific priority cell list (MPCL) is composed from the selected network cells and the operation of the mobile station is controlled according to this priority cell list. Priority cell information can be stored in the list to be composed by using, for example, CI (Cell Identity) and LAI (Location Area Identifier), or only the CI. An priority cell list consisting of the local service cell data of the mobile station is transmitted to the mobile station MS during location update. On the basis of the priority cell list, the mobile station recognizes the priority cells from which it can receive special services to which the other mobile stations are not entitled. The publication does not describe the use of an priority cell list in base station selection.

FIG. 1 of the attached drawing shows a simplified block diagram of the Pan-European GSM mobile communication system. The MS (Mobile Station) is connected via a radio path to a BTS (Base Transceiver Station), in FIG. 1, to the base station BTS1. An idle mobile station MS receives the broadcast from the base station it has selected. A BSS (Base Station Subsystem) consists of a BSC (Base Station Controller) and base stations BTS controlled by it. An MSC (Mobile Services Switching Center) usually controls several base station controllers BSC. The mobile services switching center MSC is connected to other mobile services switching centers, to a GMSC (Gateway Mobile Services Switching Center), and possibly to an intelligent network IN. Via the GMSC, the GSM network is connected to other networks, such as the PSTN (Public Service Telephone Network), PLMN (another mobile communication network), ISDN network or the intelligent network IN. The operation of the entire system is monitored by the OMC (Operation and Maintenance Center).

The subscriber data of the mobile station MS is permanently stored in the HLR (Home Location Register) of the system and temporarily in the VLR (Visitor Location Register) of the area, in which the mobile station MS is located at the time. The VLR contains the location data for the mobile station MS at the accuracy of the LA (Location Area). The geographic area monitored by the VLR is divided into one or more location areas LA within which the mobile station MS can move freely without notifying the VLR. There can be one or more base stations BTS operating in each location area.

The base stations BTS continuously broadcast information about themselves and their surroundings in their broadcast channel, such as the CI (Cell Identity), information about the neighboring cells, and the location area information LAI. According to the LAI the mobile station MS receiving the broadcast channel from the base station BTS can recognize the location area LA in which the mobile station is located. If the mobile station MS notices, when changing the base station BTS, that the location area information LAI of the base station has changed, the mobile station transmits a location update request into the network.

When moving within the area of the mobile communication network, the mobile station MS normally switches to listen to the base station BTS with the strongest signal. The system tries to establish any mobile station MS originated or terminated calls via this base station BTS. If the base station BTS into which the mobile station MS is connected, cannot provide a traffic channel for the call setup, the mobile station MS attempts the call setup with the base station that provides the next strongest signal. This method is called directed retry FIG. 2a of the attached drawing shows the signaling of the GSM system between the mobile communication network and the mobile station MS in the establishment of a mobile station MS originated call. When the mobile station MS wants to establish a call, it transmits a signaling channel request Channel_request (message 21) to the network which the network answers by assigning the mobile station MS an SDCCH (Stand alone Dedicated Control Channel) by using the message Immediate_assignment (message 22). The mobile station MS uses the assigned channel to transmit a service request message CM_service_request (message 23) which indicates the quality of the requested service which is, in this case, the call setup in the traffic channel. The authentication of the subscriber for controlling the network access and to prevent different misuses is performed by using the messages Authentication_request (message 24) and Authentication_response (message 25). The authentication is performed by comparing the data stored in the network to the data stored in the mobile station MS. After successful authentication the messages Cipher_mode_command (message 26) and Cipher_mode_complete (message 27) are used to convey data about the ciphering algorithm used for the connection. The messages Setup (message 28) and Call_proceeding (message 29) are used to convey more detailed information about the call to be set up, among other things, the mobile station MS transmits to the network the telephone number which the caller wants to call. The network assigns the mobile station MS a traffic channel for the call by using the message Assignment_command (message 30) which is acknowledged by the mobile station MS by the message Assignment_complete (message 31). At item 32 the mobile station MS receives a line alert tone and when subscriber B answers the call, the connection is established by using the messages Connect (message 33) and Connect_acknowledge (message 34). After this the call is continued in a normal fashion in the traffic channel.

FIG. 2b of the attached drawing shows in the corresponding fashion the call setup signaling of the GSM system in the case of a mobile station MS terminated call. Same reference numbers as in FIG. 2a are used for the messages in FIG. 2b that correspond to the messages explained in FIG. 2a. The network pages the mobile station MS by transmitting the message Paging_request (message 35) of FIG. 2b which the MS reacts to by transmitting the signaling channel request Channel_request (message 21) to the network. The network assigns the MS a signaling channel by using the message Immediate_assignment (message 22) in the same manner as above. The MS uses the assigned signaling channel to transmit a response to the paging message Paging_response (message 36). Subscriber authentication and the data about the ciphering algorithm to be used are exchanged by using messages 24 to 27 as desribed above. Messages Setup (message 37) and Call_confirmed (message 38) are used to initialize the call setup, and messages Assignment_command (message 30) and Assignment_complete (message 31) are used to assign a traffic channel for the mobile station MS for the call. At item 39 the mobile station MS sounds the alert tone and when the mobile station subscriber answers the call, the connection is established by using the messages Connect (message 40) and Connect_acknowledge (message 41). After this, the call is continued in the traffic channel in the normal fashion.

In cellular mobile communication systems the radio coverage is implemented by using several, slightly overlapping radio cells. When the mobile station moves from one cell to another, the system performs a handover to the new radio cell based on predefined handover criteria. The system attempts to perform the handover in a manner that disturbs the ongoing call as little as possible. The handover is normally caused by the criteria of the radio path but it can also be performed for other reasons, such as dividing the load more evenly or to decrease the transmission power. The handover can also be performed within the cell from one traffic channel to another. It is also possible to define a neighbor cell priority list for the base station BTS in which one or some of the neighboring cells of the base station are defined as primary target cells for handover. In this case, the handover is always performed to these priority cells whenever possible. This neighboring cell priority list is base station-specific, and the handover for all mobile stations is performed in the same manner by using it.

The mobile station MS continuously measures the signals of the base stations BTS located nearest to the camping cell, for example, to determine the base station that provides the best signal, and in case of a possible handover. Based on the neighboring cell information broadcast by each base station in its broadcast channel the mobile station MS recognizes which of the neighboring cells it should observe For example, in the GSM mobile communication system the mobile station MS can measure the level and quality of the signal of the serving base station and simultaneously the signal level of up to 32 other base stations. The mobile station MS frequently transmits the measurement results as a report message via the serving base station BTS1 to the base station controller BSC. The report message contains the measurement results of the serving base station and those of up to the six best neighboring base stations. The handover from the current cell to a surrounding cell or to another channel of the current cell may occur, for example, when the measurement results of the mobile station and/or base station controller indicate that the signal level and/or quality of the current cell channel are low and it is possible to obtain a better signal level from one of the surrounding cells, or by switching to another channel, or when one of the surrounding cells/another channel makes it possible to continue traffic by using lower transmission power levels. The selection of the handover target cell is affected, e.g., by the signal level and/or load of the target cell. Therefore, commonly used handover criteria include, for example, the signal level and quality of the radio connection, the signal levels of the current cell and target cell, the signal quality of the current cell, the transmission power required of and allowed for the mobile station in the target cell. The handover from one traffic channel to another or from one signaling channel to another is usually performed when the handover criteria set by the operator are met. It is possible that the handover must be performed because of an overload. Directed retry should also be interpreted as a handover, when the traffic channel that is selected during the call setup is selected from a cell other than that in which the signaling was performed.

FIG. 3 of the attached drawing demonstrates the signaling transmitted in the handover between two base station sub-systems BSS. In the initial situation of the handover in FIG. 3 a radio connection has been established to the mobile station MS, for example, for transmission of voice, data, or signaling, via the base station BTS1 and base station controller BSC1 (not shown in the figure) belonging in base station sub-system BSS1. The base station controller BSC1 receives measurement results about the measurements of the base station BTS1 and mobile station MS and, if necessary, directs a handover from the base station BTS1 to, for example, another base station controlled by the base station sub-system BSS1. When the base station subsystem BSS1 detects the need for a handover to a base station controlled by another base station sub-system, the base station sub-system BSS1 transmits a handover request to the mobile services switching center MSC in the message Handover_required (message 1) which also states the reason for the handover, for example, the quality or signal level of the radio connection, and the identity/identities of the handover target cell. The mobile services switching center MSC transmits the handover request in Handover_request (message 2) to the base station sub-system of the target cell, in FIG. 3 to the base station sub-system BSS2, which states that the radio connection of the mobile station MS will be handed over to the base station sub-system BSS2. The base station sub-system BSS2 responds to mobile services switching center MSC by transmitting the message Handover_request_acknowledge (message 3) which indicates the new radio channel allocated for the mobile station MS. The mobile services switching center MSC transmits the radio channel data to the base station sub-system BSS1 in the message Handover_command (message 4) which is further transmitted by the base station sub-system BSS1 to the mobile station MS in the message Handover_command (message 5). The mobile station MS performs the handover by switching to the new, assigned radio channel, and it acknowledges the successful handover to the base station subsystem BSS2 by transmitting the message Handover_complete (message 6). The base station sub-system BSS2 further transmits the message about successful handover to the mobile services switching center MSC in the message Handover_complete (message 7). The mobile station MS continues the traffic via a base station and a base station controller belonging in the base station sub-system BSS2.

The problem in the currently recognized call setup and handover methods is that the selection of the base station does not support the direction of the mobile station in mobile communication networks that offer the special services tailored in its priority cells but the call setup and handover are performed identically for all mobile station subscribers.

SUMMARY OF THE INVENTION

The object of this invention is to implement the base station selection in call setup and handover by taking into account any mobile station-specific special cells.

This new type of handover can be implemented by using a method according to this invention for which it is characteristic that the cell to be assigned to the mobile station is selected on the basis of the measurement results and the special cell list, and the selected cell is set as the target cell for the handover for the mobile station.

Furthermore, the new type of call setup is reached by using a method according to this invention for which it is characteristic that the cell to be assigned to the mobile station is selected on the basis of the measurement results and the special cell list, and the mobile station is assigned a traffic channel from the base station of the selected cell.

Furthermore, the invention relates to the arrangement for selecting the base station for establishing a radio connection in the mobile communication system, said arrangement including the equipment for receiving the measurement results of the mobile station and the equipment for directing the mobile station to the channel of the selected base station, and the mobile station. It is characteristic of the said arrangement, according to the invention, that it includes the equipment for receiving and storing the special cell list, said special cell list including the identifier for at least one cell that offers special service to the mobile station, and the equipment for selecting the base station for the radio connection on the basis of the said special cell list and measurement results. It is characteristic to the mobile station, according to the invention, that it includes the equipment for storing the special cell list, said special cell list including the identifier for at least one cell that offers special service to the mobile station, and the equipment for transmitting the special cell list to the mobile communication network.

The invention is based on the idea that the base station selection is performed on the basis of the special cell list composed for the mobile station When the base station controller directs the selection of the base station, the special cell list of the mobile station subscriber is transmitted to the base station controller during call setup and, if necessary, during handover execution either from the mobile station or from the mobile services switching center. The system attempts to direct the mobile station to its special service area in call setups and handovers. By using the special cell list it is possible to divide the cells of the network into special cells from the view-point of a single mobile station, for example, into priority cells and common cells. In call setup the mobile station is assigned a traffic channel from the base station of a cell defined as a priority cell for the mobile station when the mobile station is located in the area of such a priority cell. The base station of a cell defined as a priority cell for the mobile station is selected as a target cell for handover when the signal of the base station of such a priority cell is suitable for the handover. In an embodiment of the invention, a handover criterion is set which the signal of the base station of the cell defined as a priority cell in the priority cell list must meet in order for the handover from a common cell of the network to the priority cell of the mobile station to be performed.

The advantage of this kind of a selection of the base station performed during handover and call setup is that the mobile station is directed to the special service area and it is kept there whenever it is suitable from the radio technical point of view.

Another advantage of an arrangement according to the invention is that it provides better options for offering individual mobile station subscribers special tailored services preferably throughout the entire call.

The advantage of the mobile station according to the invention is that the functionality according to the invention can be implemented by making minor changes to a mobile station at the prior art.

BRIEF DESCRIPTION OF THE DRAWINGS

The description of the preferred embodiments of the invention will now be made with reference to the attached drawings, in which.

DETAILED DESCRIPTION OF THE INVENTION

Figure 1:
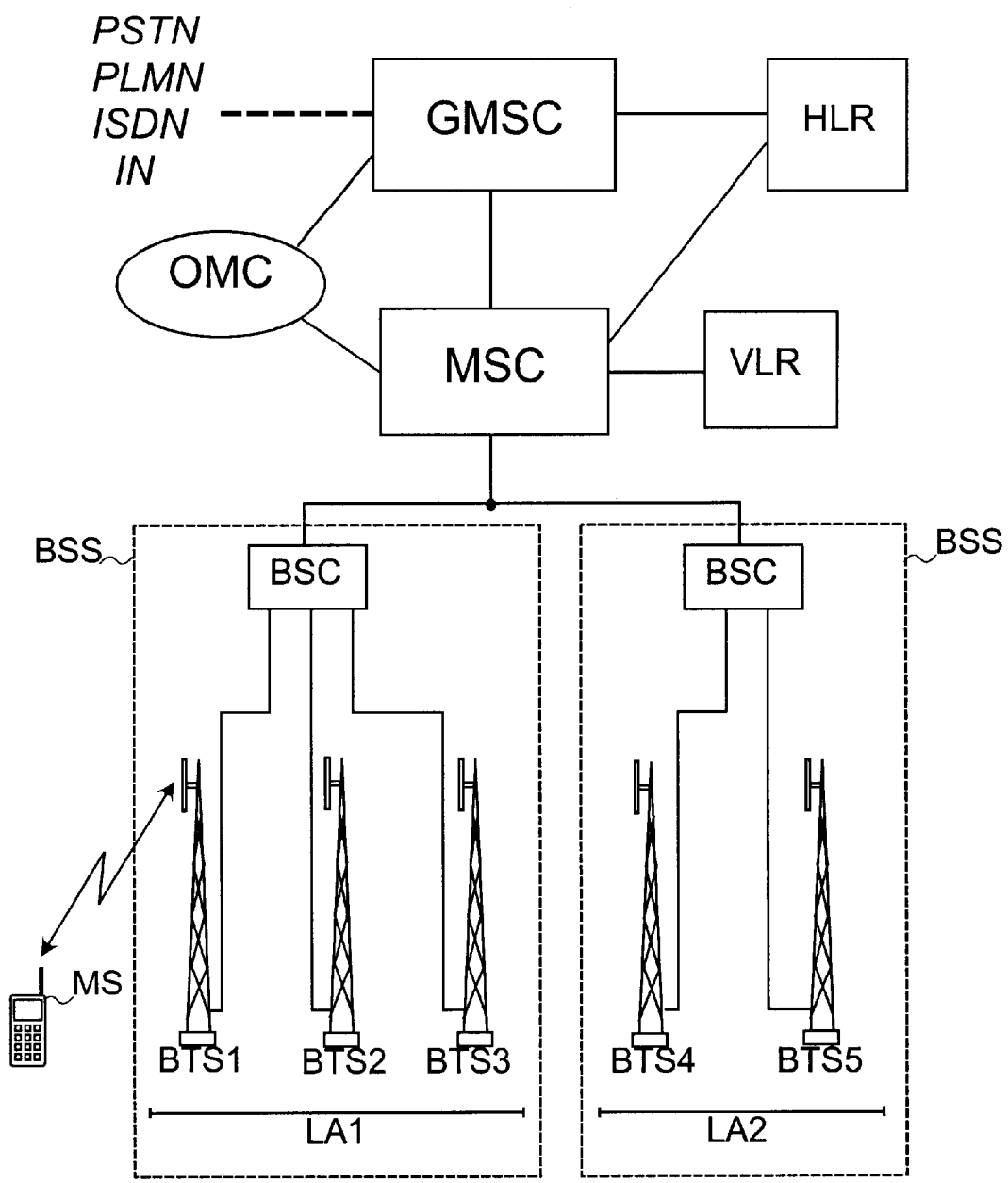
FIG. 1 shows the parts of the mobile communication network that are essential for the invention.

The present invention can be applied in any mobile communication system. The invention will be described below in more detail mostly by using the Pan-European digital mobile communication system GSM (Groupes Speciale Mobile) as an example. FIG. 1 shows the simplified structure of a GSM network as described earlier. For a more detailed description of the operation and structure of a GSM system, a reference is made to GSM specifications and to a book "The GSM System for Mobile Communications", M. Mouly & M. Pautet, Palaiseau, France, 1992, ISBN:2-9507190-0-7.

The idea according to the present invention can be applied for handover and call setup in a mobile communication system.

Figure 3:
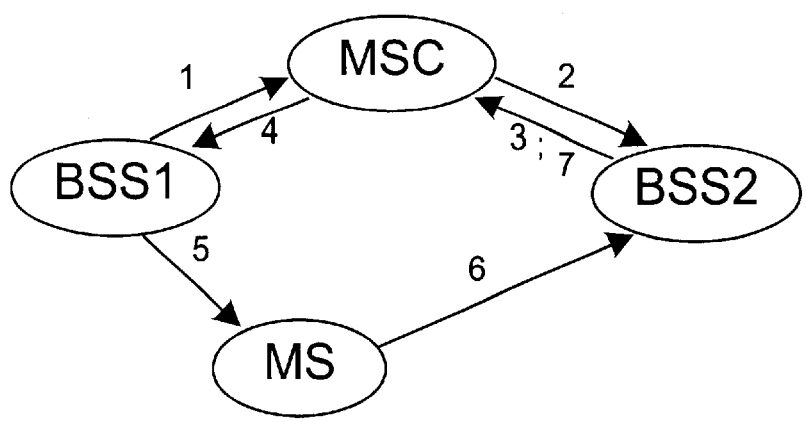
FIG. 3 shows the messages transmitted between the different network elements in a handover.
Figure 4:
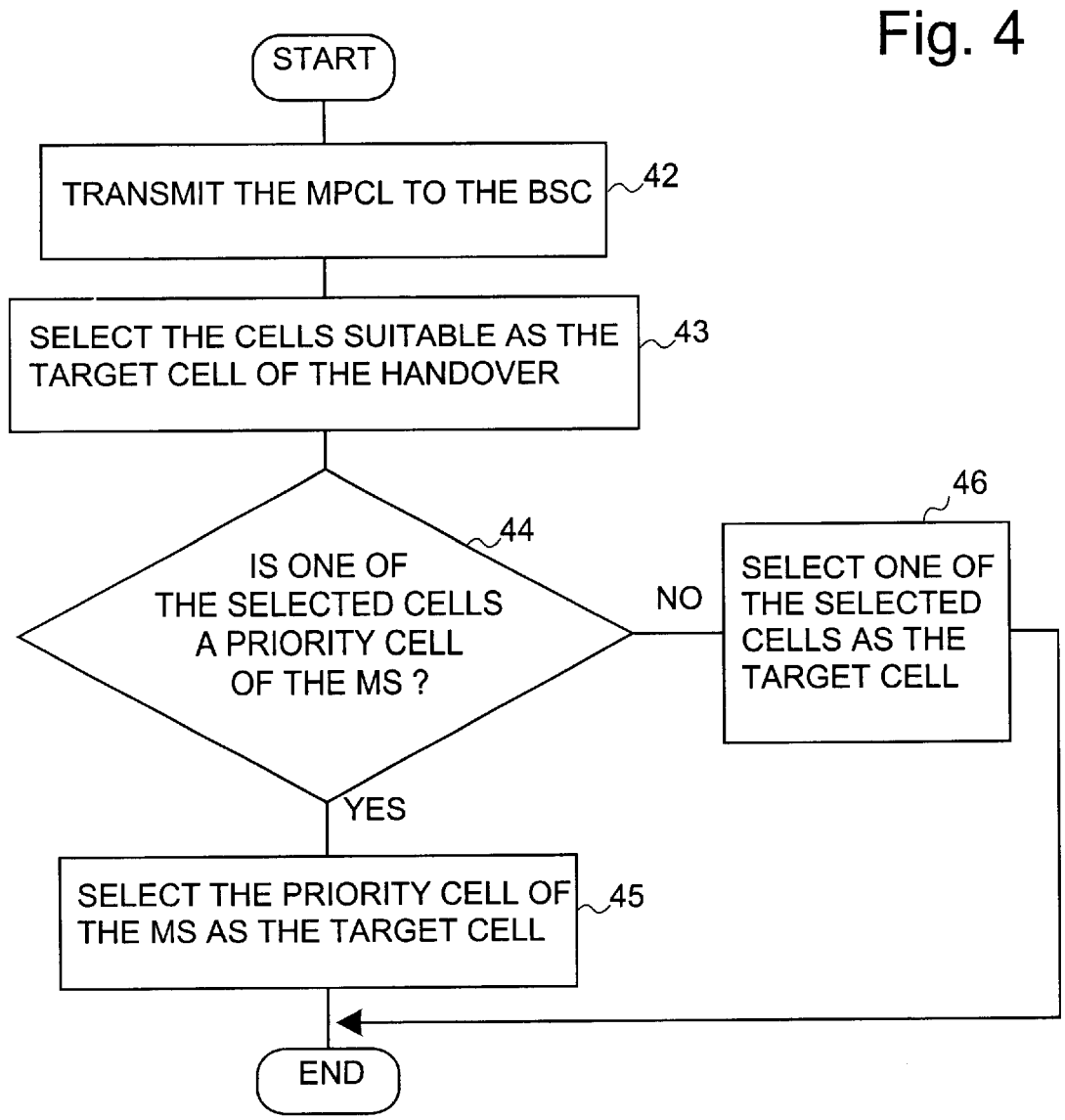
FIG. 4 shows the handover method according to the invention as a flow diagram.

The following is a more detailed description of the first implementation of the invention which applies to handover. The first implementation of the invention is described in the following in the light of the primary embodiment of handover by referring to FIG. 4. In the primary embodiment of handover method the mobile services switching center MSC transmits the priority cell list of the mobile station MS to the unit that controls the handover, for example, to the base station controller BSC (FIG. 4, item 42). During the call setup phase the mobile services switching center MSC receives the priority cell list from another part of the network, for example, from the intelligent network IN or from the home location register HLR The mobile services switching center MSC further transmits the received priority cell list, for example, to the base station controller BSC during the call setup phase by using a subscriber-specific connection in a new message according to the invention, MS_priority_cell_information. When the unit that controls the handovers for the mobile station MS changes, for example, when the radio connection of the mobile station MS is transferred to the control of another base station sub-system BSS, as shown in FIG. 3, to the control of the base station sub-system BSS2, the priority cell list is transmitted to the base station subsystem of the target cell for the handover, in case of FIG. 3, to the base station sub-system BSS2. In this case, the priority cell list is transmitted, for example, during the handover signaling described earlier in the description of FIG. 3. It is possible to add a new field in the message Handover_request (message 2) transmitted by the mobile services switching center MSC to the base station sub-system BSS2 in which the priority cell list is appended. It is possible to deliver the priority cell list to the mobile services switching center MSC from another part of the network, for example, during the call setup phase, as described earlier, or from the base station sub-system BSS that initiates the handover, in case of FIG. 3, from the base station sub-system BSS1, attached to the new field appended to the message Handover_required (message 1) shown in FIG. 3.

The unit that controls the handover, for example, the base station controller BSC, monitors the need for a handover according to the prior art according to the measurements performed by the base station BTS and/or the mobile station MS. When the handover must be performed, the base station controller BSC selects the cells which meet the set handover criteria based on the measurement results according to the prior art, or, in other words, which are suitable as the target cell for handover (FIG. 4, item 43). According to the present invention, the base station controller BSC compares, in item 44, the identifiers of the selected cells to the identifiers of the priority cells in the priority cell list. If one of the selected cells is a cell defined as a priority cell for the mobile station, this priority cell is selected as the target cell for the handover (item 45) and the handover is performed to this cell. If none of the possible target cells is defined as the priority cell for the mobile station MS, the base station controller BSC selects as the target cell one of the cells that meet the handover criteria according to the prior art (item 46). If the handover is performed to another base station sub-system, the priority cell list of the mobile station MS is transmitted to the new base station sub-system BSS during the handover by using the method described earlier.

Figure 2A:
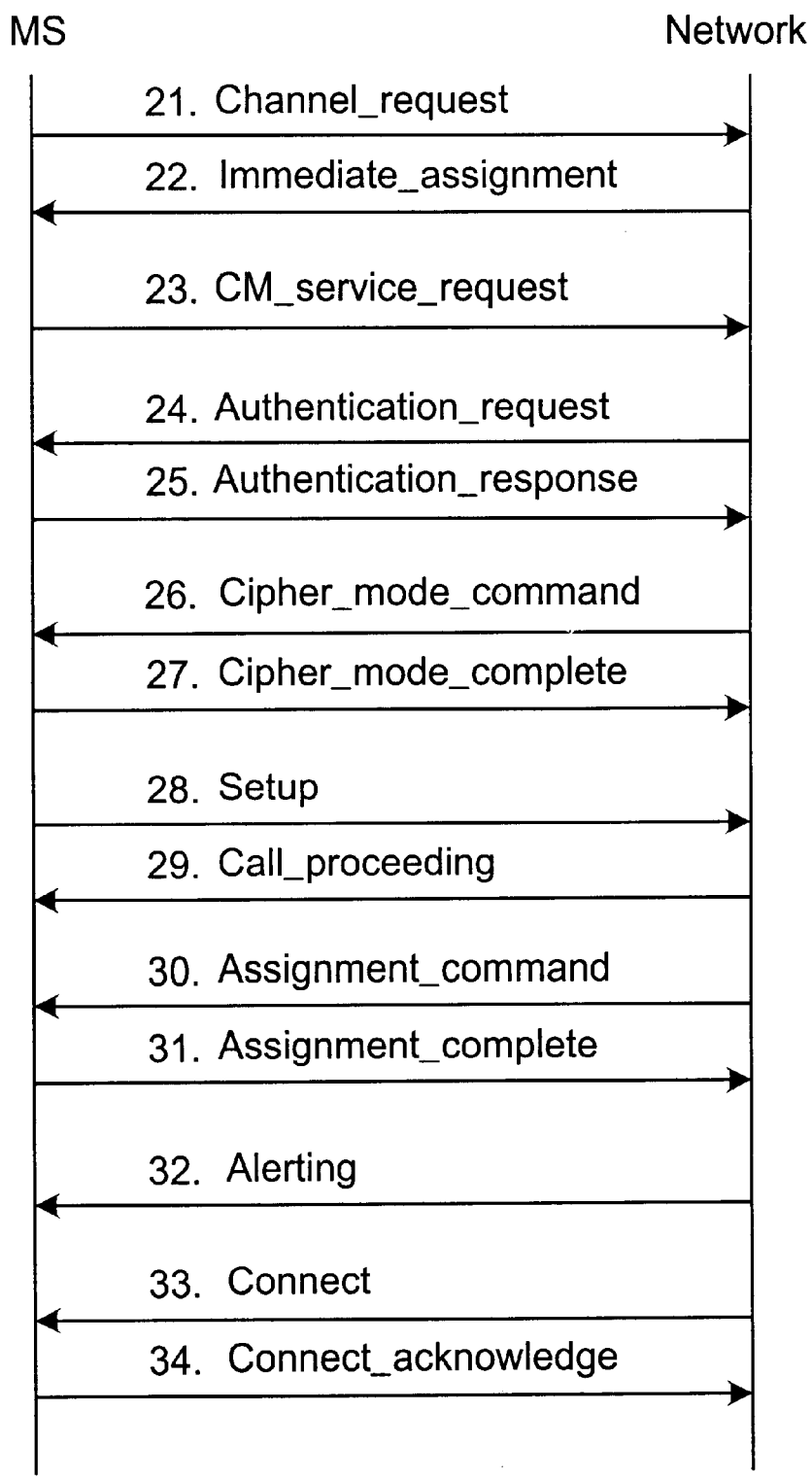
FIG. 2a shows the call setup according to the prior art as a signaling chart for a call initiated by the mobile station.
Figure 2B:
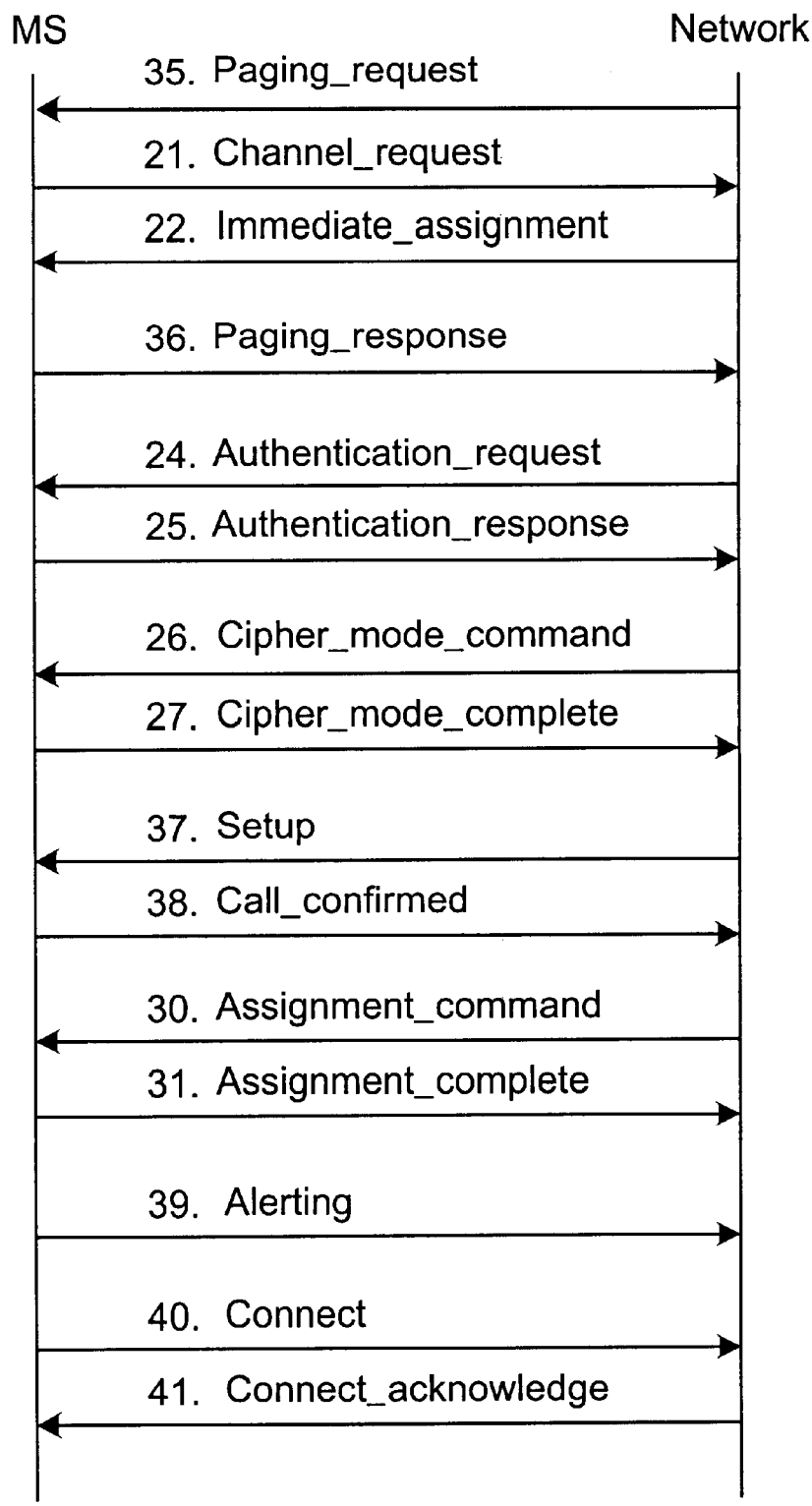
FIG. 2b shows the call setup according to the prior art as a signaling chart for a call terminating in the mobile station.
Figure 5A:
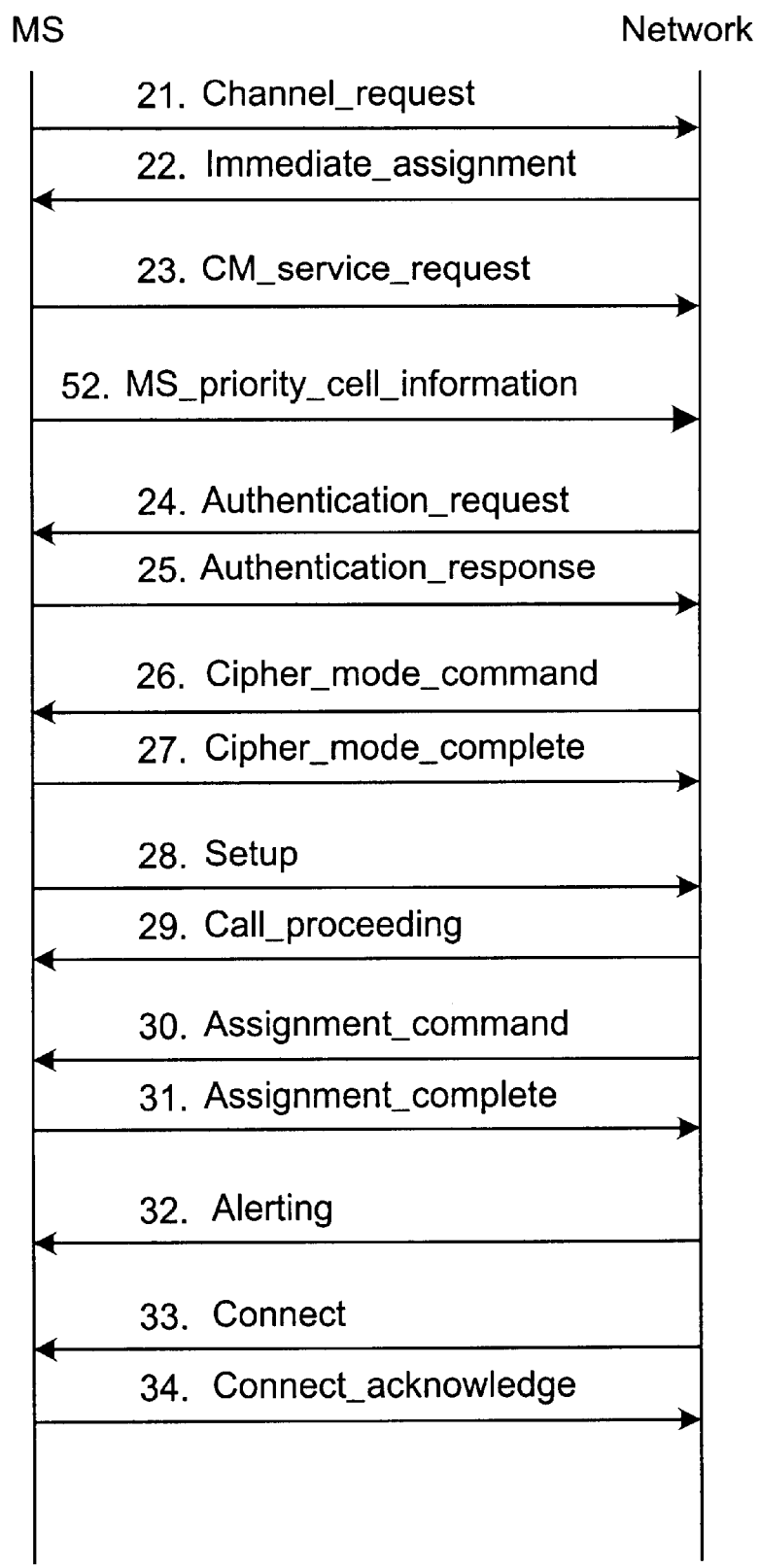
FIG. 5a shows the transmission of a mobile station-specific priority cell list according to the invention from the mobile station during the call setup signaling in a call initiated by the mobile station.
Figure 5B:
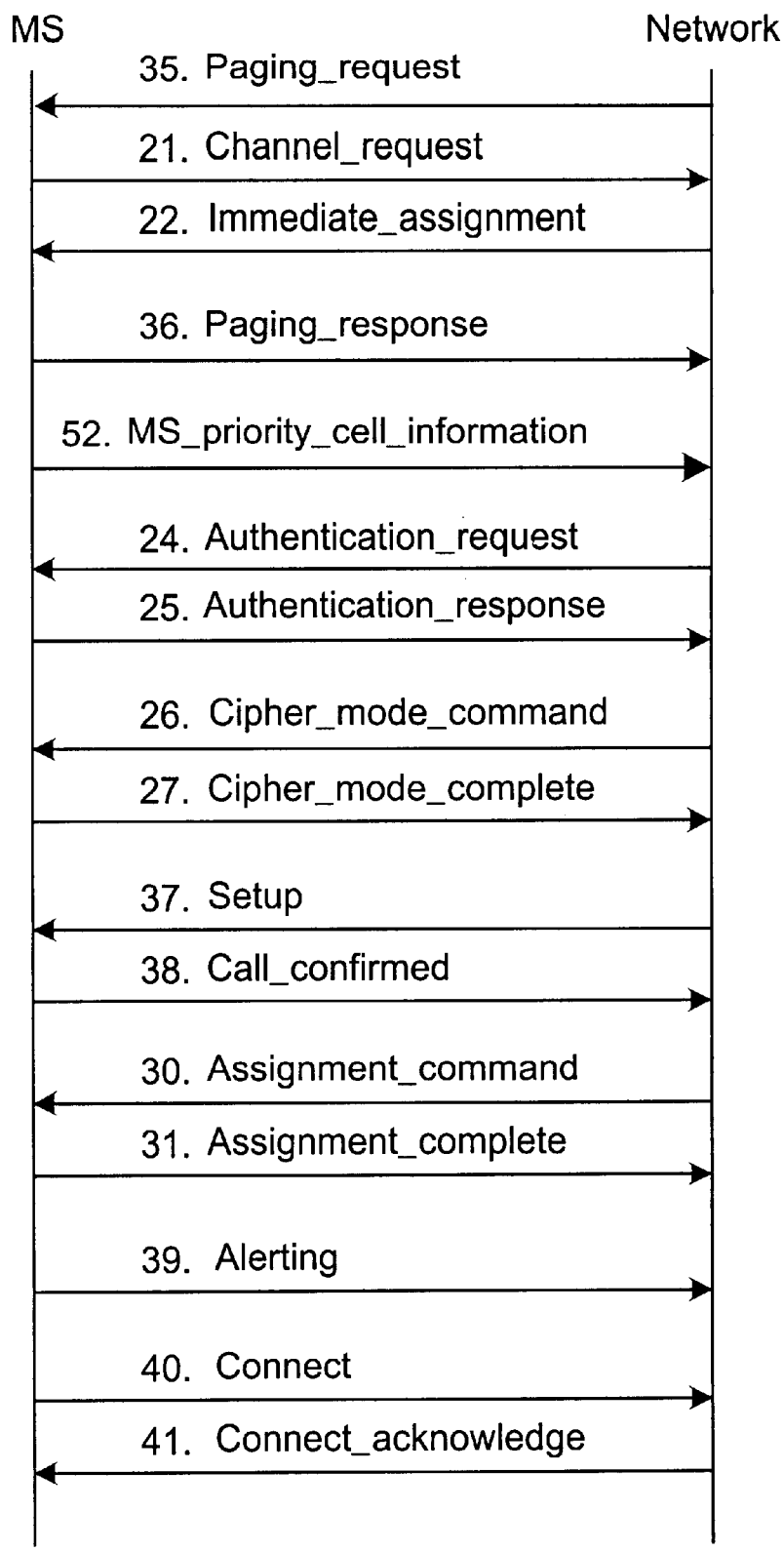
FIG. 5b shows the transmission of a mobile station-specific priority cell list according to the invention from the mobile station during the call setup signaling in a call terminating in the mobile station.

In the secondary embodiment of handover method the mobile station MS transmits the priority cell list to the network during the signaling phase of the call setup, for example, in the manner shown in FIGS. 5a and 5b, and during handover signaling. FIG. 5a shows the call setup signaling in a mobile station MS originated call, when the priority cell list is transmitted during call setup according to the present invention from the mobile station MS to the network. The messages of FIG. 5a are for other parts similar to the messages for FIG. 2a explained earlier but the MS transmits preferably immediately after the message CM_service_request (message 23) the new message according to the invention MS_priority_cell_information (message 52) to the base station BTS. FIG. 5b shows correspondingly the call setup signaling in a mobile station MS terminated call, when the priority cell list is transmitted during call setup according to the present invention from the mobile station MS to the network. The messages in FIG. 5b are for other parts similar to the messages in FIG. 2b described earlier, but the MS transmits preferably immediately after the message Paging_response (message 36) the new message according to the invention MS_priority_cell_information (message 52) to the BTS. The message 52 which includes the priority cell list transmitted by the mobile station MS to the base station BTS is further transmitted to the unit that controls the handover, for example, to the base station controller BSC (FIG. 4, item 42).

In handover between base station sub-systems, in the secondary embodiment of the invention, the system requests the delivery of the priority cell list from the mobile station MS. A new field is added according to the invention in the message Handover_command (message 5) shown in FIG. 3 transmitted by the base station BTS to the mobile station MS during handover, the value of which indicates whether the mobile station MS must transmit the priority cell list to the new base station subsystem or not. If the system requests the delivery of the priority cell list from the mobile station MS, the mobile station MS transmits the priority cell list to the new base station sub-system in a new field which is appended, according to the invention, to the message Handover_complete (message 6). In FIG. 3, this new base station sub-system is the base station sub-system BSS2. The secondary embodiment of handover according to the invention corresponds otherwise essentially to the handover according to the primary embodiment described before in the light of items 43 to 46 of FIG. 4.

The third embodiment of the first implementation of the invention only differs from the primary and secondary embodiments described earlier for the delivery of the priority cell list (FIG. 4, item 42). In the third embodiment of handover according to the invention the priority cell list is delivered from the mobile station MS to the unit that controls the handover as an attachment to the measurement report. The mobile station MS frequently transmits a measurement report to the serving base station RTS which contains the measurement results for the serving base station and up to the six best neighboring base stations. In the third embodiment of the invention the mobile station attaches an identifier to each measurement result of this measurement report which indicates whether the reported base station is the base station for a cell defined as a priority cell in the priority cell list or a common base station as far as the mobile station MS is concerned. As far as the mobile station MS is concerned, all cells, other than those defined as priority cells, are common cells, for they do not provide the mobile station MS with a special service that would differ from the service commonly offered to other mobile stations.

In other embodiments of handover according to the invention the delivery of the priority cell data can be arranged suitably by joining the transmissions described before for the primary, secondary, and tertiary embodiment of the invention. It is possible to deliver the priority cell list to the unit that controls the handover, for example, by transmitting the priority cell list during the call setup phase from the mobile station MS according to the secondary embodiment described above, and during a handover to the area of another base station subsystem from the mobile services switching center MSC according to the primary embodiment described above. The advantage for delivery of the priority cell list via the mobile services switching center MSC in handovers between base station sub-systems is that the new message according to the invention, MS_priority_cell_information, has room for more priority cell identifiers than the message Handover_complete (message 6) transmitted from the mobile station MS.

Figure 6:
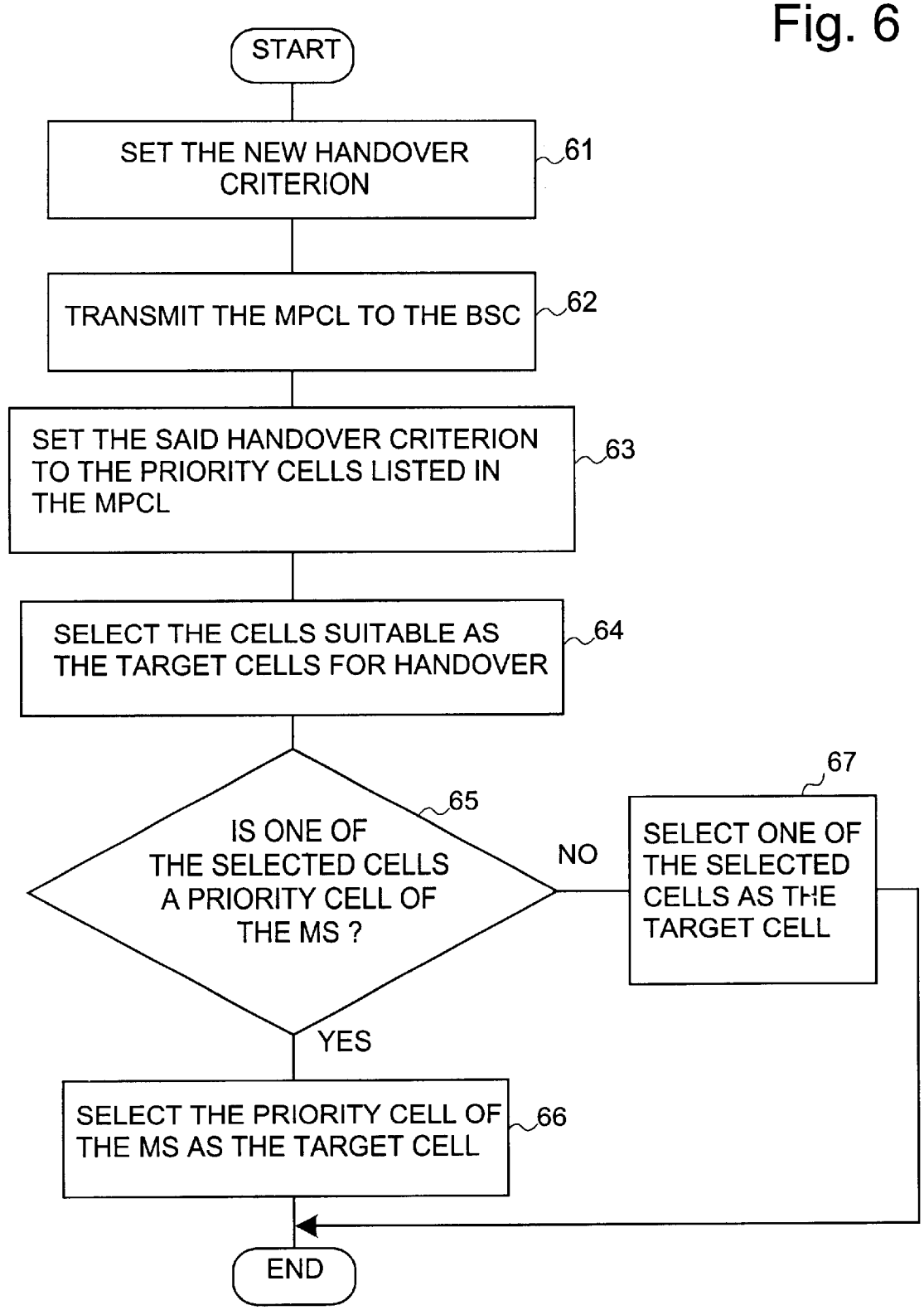
FIG. 6 shows the fourth embodiment of the handover method according to the invention as a flow chart.

FIG. 6 shows the fourth embodiment of handover according to the invention as a flow chart. In this embodiment of the invention a new handover criterion is set for the handover from a common cell of the network to a cell defined as a priority cell for the mobile station. This new handover criterion facilitates the handover to a priority cell. The new handover criterion can be defined as a neighboring cell-specific or as base station controller-specific.

The new handover criterion is set in item 61 in FIG. 6, for example, the signal level criterion or power budget criterion which is easier to meet than the corresponding normal handover criterion. Such a signal level criterion can be, for example, home_cell_rx_level which sets the requirement for the signal level of the base station of the priority cell as compared to the signal level of the current common cell. The signal level criterion according to the invention is preferably smaller by value than the signal level criterion for handover between two cells according to the prior art. In item 62 of FIG. 6 the priority cell list is being transmitted to the unit that controls the handover, for example, to base station controller BSC, from the mobile services switching center MSC or from the mobile station MS according to one of the embodiments described above. In item 63 of FIG. 6 the new handover criterion according to the invention described above is being set to the priority cells listed in the priority cell list. In item 64 the cells that meet the set handover criteria, or the cells that are suitable as target cells for handover, are selected. In case of priority cells, the meeting of handover criteria requires that the cell meets the new handover criteria according to the invention, but not necessarily that the cell meets the handover criterion according to the prior art that measures the corresponding quantity. In item 65 of FIG. 6 the system determines, whether one of the cells selected as suitable for handover according to item 64 described above is a priority cell defined in the priority cell list corresponding to the description of FIG. 4 above. If such a priority cell suitable as the handover target cell is found, this priority cell is selected as the target cell for handover (item 66) and the handover is performed to this cell. If none of the cells suitable as the target cell is a priority cell for the mobile station, one of the other cells selected according to the prior art is selected as the target cell for the handover (item 67) and the handover is performed to this common cell.

The handovers according to the invention can also be defined to be performed so that the handover from priority cells is always attempted to perform to another priority cell. Handovers from a priority cell to a common cell of the network can be allowed, for example, only when the handover to a priority cell is not possible and the measurements both in the base station BTS and in the mobile station MS indicate a low reception level or quality in the connection and a rapid decrease in the signal level.

A handover method according to the invention is also suitable to be used when switching from one signaling channel to another and for directed retry.

Figure 7:
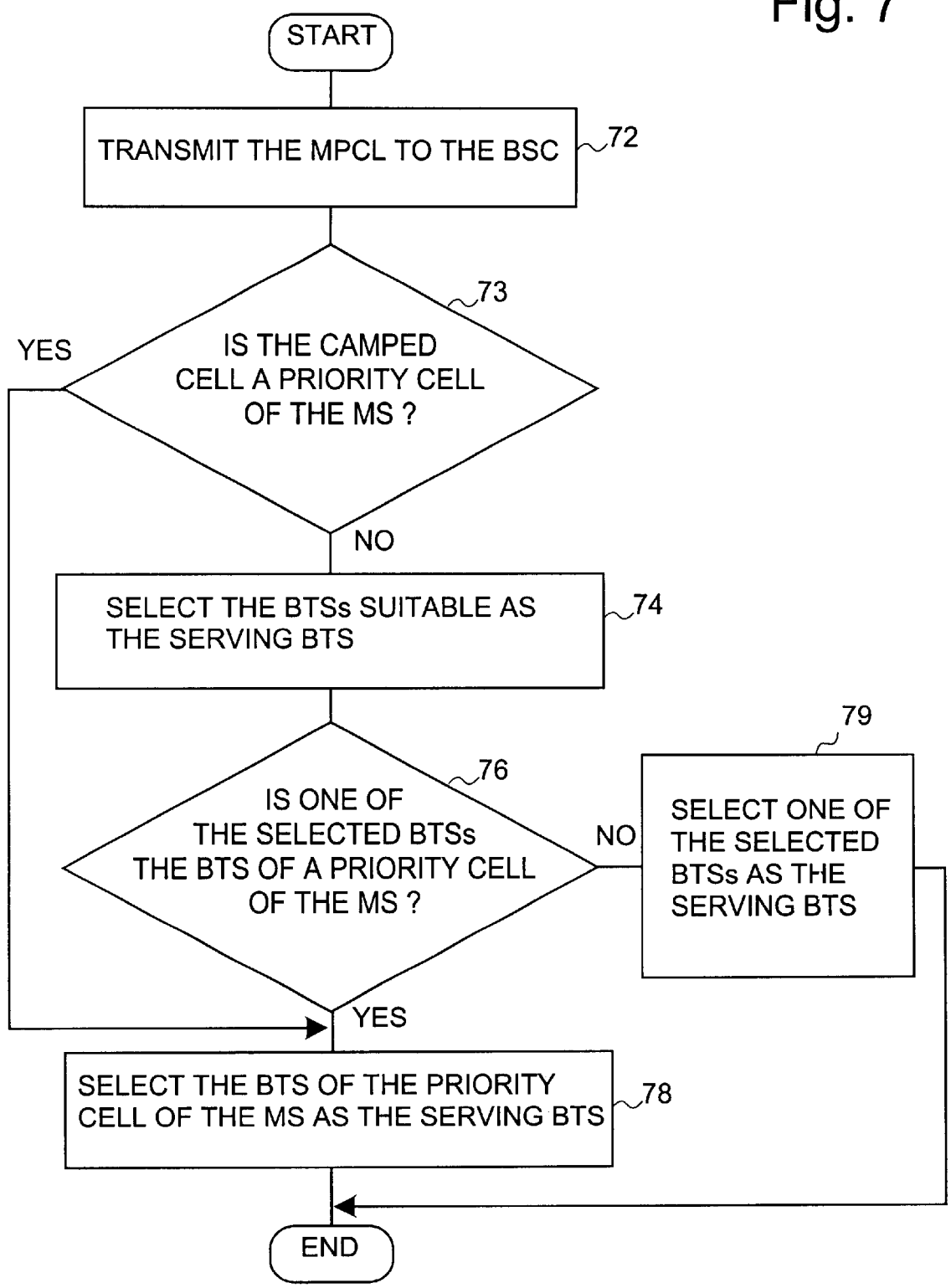
FIG. 7 shows the call setup method according to the invention as a flow chart.

The following gives a more detailed description of the second implementation of the invention: call setup. This is described in the following in the light of the primary embodiment of call setup referred to in FIG. 7. In the primary embodiment of call setup method, the mobile services switching center MSC transmits the priority cell list of the mobile station MS to the unit that controls the call setup, for example to the base station controller BSC (FIG. 7, item 72). During call setup the mobile services switching center MSG receives the priority cell list from another part of the network, for example, from the intelligent network IN or from the home location register HLR. The mobile services switching center MSC transmits the received priority cell list further, for example, to the base station controller BSC during call setup phase in the new message according to the invention, MS_priority_cell information, which is transmitted via the subscriber-specific connection. In item 73 the unit that controls the call setup, for example, the base station controller BSC, compares the identifiers of the priority cells in the priority cell list of the mobile station to the identifier of the camping cell. If, according to its priority cell list, the mobile station MS is located in a priority cell during the call setup phase, the cell selected to be assigned to the mobile station MS is the priority cell in which the mobile station MS is located (item 78) and the call setup is performed to the traffic channel of the base station BTS of this priority cell in which the mobile station MS is located. If the camping cell is not a cell defined as a priority cell for the mobile station according to the priority cell list, the system selects, on the basis of the measurement results delivered by the mobile station, the base stations BTS suitable as the cell for the call setup including the camping cell (item 74). Item 76 compares the identifiers of the priority cells listed in the priority cell list to the identifiers of the cells selected as suitable for the serving cell. If one of the base stations df the selected cells is defined as a priority cell for the mobile station, the base station BTS of this priority cell is selected as the serving base station for the call setup (item 78) and the call setup is performed to the traffic channel of this priority base station. If none of the selected base stations suitable for call setup are base stations for priority cells listed in the priority cell list, the system selects, according to the prior art, a base station other than the priority cell base station as the serving base station (item 79) and the call setup is performed via this base station. In item 79 it is possible to select the base station of the camping cell, or the base station of some other cell, as the serving base station.

In the secondary embodiment of call setup method, the mobile station MS transmits Its priority cell list to the network during the signaling phase of the call setup, for example, by using the method shown in FIGS. 5a and 5b. FIG. 5a which was described above in connection with the handover method shows the call setup signaling in a mobile station MS originated call, when the priority cell list is transmitted according to the present invention during the call setup from the mobile station MS to the network preferably immediately after the message CM_service_request (message 23) in a new message according to the invention, MS_priority_cell_information (message 52). FIG. 5b shows, correspondingly, the call setup signaling in a mobile station terminated call, when the priority. cell list is transmitted according to. the present invention during the call setup from the mobile station MS to the network preferably immediately after the message Paging_response (message 36) in a new message according to the invention, MS_priority_cell_information (message 52). The message 52 transmitted by the mobile station MS to the base station BTS which contains the priority cell list is further transmitted to the unit that controls the call setup, for example, to the base station controller BSC (FIG. 7, item 72). The secondary embodiment of call setup according to the invention otherwise corresponds essentially in the same way to the call setup as used in the primary embodiment of call setup described above in light of the items 73 to 79 of the FIG. 7.

The third embodiment of the second implementation of the invention differs significantly from the above described primary and secondary embodiments only for the delivery of the priority cell list (FIG. 7, item 72). In the third embodiment of call setup according to the invention, the priority cell list is delivered from the mobile station MS to the unit that controls the call setup as attached to the measurement report of the mobile station. In this third embodiment it is assumed that the mobile station MS has had time to transmit the measurement reports during the call setup signaling as a report message which includes the measurement results for the serving base station and for up to the six best neighboring base stations. In the third embodiment of the invention, the mobile station attaches an identifier to each reported measurement result included in the measurement report, the said identifier indicating whether the base station being reported is the base station of a cell defined as a priority cell in the priority cell list of the mobile station or a common base station as far as the mobile station MS is concerned. As far as the mobile station MS is concerned, all cells other than those defined as priority cells are common cells, for they do not provide the mobile station MS with a special service that would differ from the service commonly offered to other mobile stations.

The new messages according to the invention described above, MS_priority_cell_information, comprise the priority cell data of the priority cell list, for example, in the same form as the data in question is included in the priority cell list composed for the mobile station.

The mobile communication system implementing the functionality according to the present invention has been adapted to deliver the priority cell list in the network messages to the units that control handover and/or call setup, preferably to base station controllers BSC. The unit of the system that controls the handover has been adapted to select the target cell for handover on the basis of the priority cell list by using the measurement results of the measurements performed by the mobile station. The unit of the system that controls the call setup has been adapted to select the base station to be used for call setup on the basis of the priority cell list by using the measurement results.

A mobile station according to the present invention includes the equipment for storing the priority cell list and the equipment for transmitting the priority cell list to the network. If necessary, the mobile station delivers the priority cell list to the network during call setup signaling and/or handover signaling or in the measurement report.

The drawings and the related description are only intended to demonstrate the principles of the invention. The details of a handover method and call setup method according to the invention can vary within the patent claims. Although the invention was herein described mostly as it related to the handling of priority cells of the priority cell list, a method according to the invention can also be used for other special cells, for example, for proscribed cells to avoid handover to these cells. The functionality according to the present invention is also suitable to be used to handle a special cell list which contains both priority and proscribed cells in which case the common cells presented in the application are the cells other than those defined as priority or proscribed.

What is claimed is:

1. A method for call setup in a mobile communication system which consists of base stations (BTS) and mobile stations (MS) and in which a special cell list has been created at least for some of the mobile stations (MS), said list being subscriber-specific and including priority cells and an identifier of at least one cell which offers special service to a mobile station, the mobile station locating in a camping cell, said method comprising:

measuring a signal level of a base station (BTS) of the camping cell and that of neighboring base stations of the base station, said measuring being performed in the mobile station (MS) and resulting in measurement results, establishing a signaling connection between the base station (BTS) and the mobile station (MS), transmitting the measurement results from the mobile station (MS) to the base station (BTS), and transmitting the special cell list of the mobile station (MS) to a unit that controls the call setup, comparing an identifier of the camping cell to the identifiers of cells listed in the special cell list of the mobile station (MS), when the camping cell is a priority cell according to the special cell list, selecting the camping cell as the cell to be assigned to the mobile station, and when the camping cell is not a priority cell according to the special cell list, performing the further steps of:

comparing identifiers of the cells suitable for the call setup on the basis of the measurement results to identifiers listed in the special cell list, selecting a cell to be assigned to the mobile station, said cell being one of the cells suitable for the call setup and being defined as a priority cell according to the special cell, when such a priority cell is available, and selecting a cell to be assigned to the mobile station, said cell being suitable for the call setup and being other than a cell defined as a priority cell according to the special cell list, when none of the cells suitable for the call setup are defined as a priority cell, assigning a traffic channel to the mobile station (MS), said traffic channel being from the base station (BTS) of the cell selected.

2. The method according to claim 1, wherein the special cell list of the mobile station (MS) is transmitted from the mobile station (MS) to the base station controller (BSC).

3. The method according to claim 1, wherein the special cell list of the mobile station (MS) is transmitted from the mobile station (MS) to the base station controller (BSC) by using a signaling connection of the call setup.

4. The method according to claim 1, wherein the special cell list of the mobile station (MS) is transmitted to the base station controller (BSC), if necessary, during handover execution.

5. The method according to claim 1, wherein the special cell list of the mobile station (MS) is transmitted from the mobile services switching center (MSC) to the base station controller (BSC).

6. The method according to claim 1, wherein the special cell list is transmitted to the base station controller (BSC) during the call setup.

* * * * *